Jan. 22, 1946.  H. T. SPARROW  2,393,427
SAFETY VALVE
Filed April 3, 1942
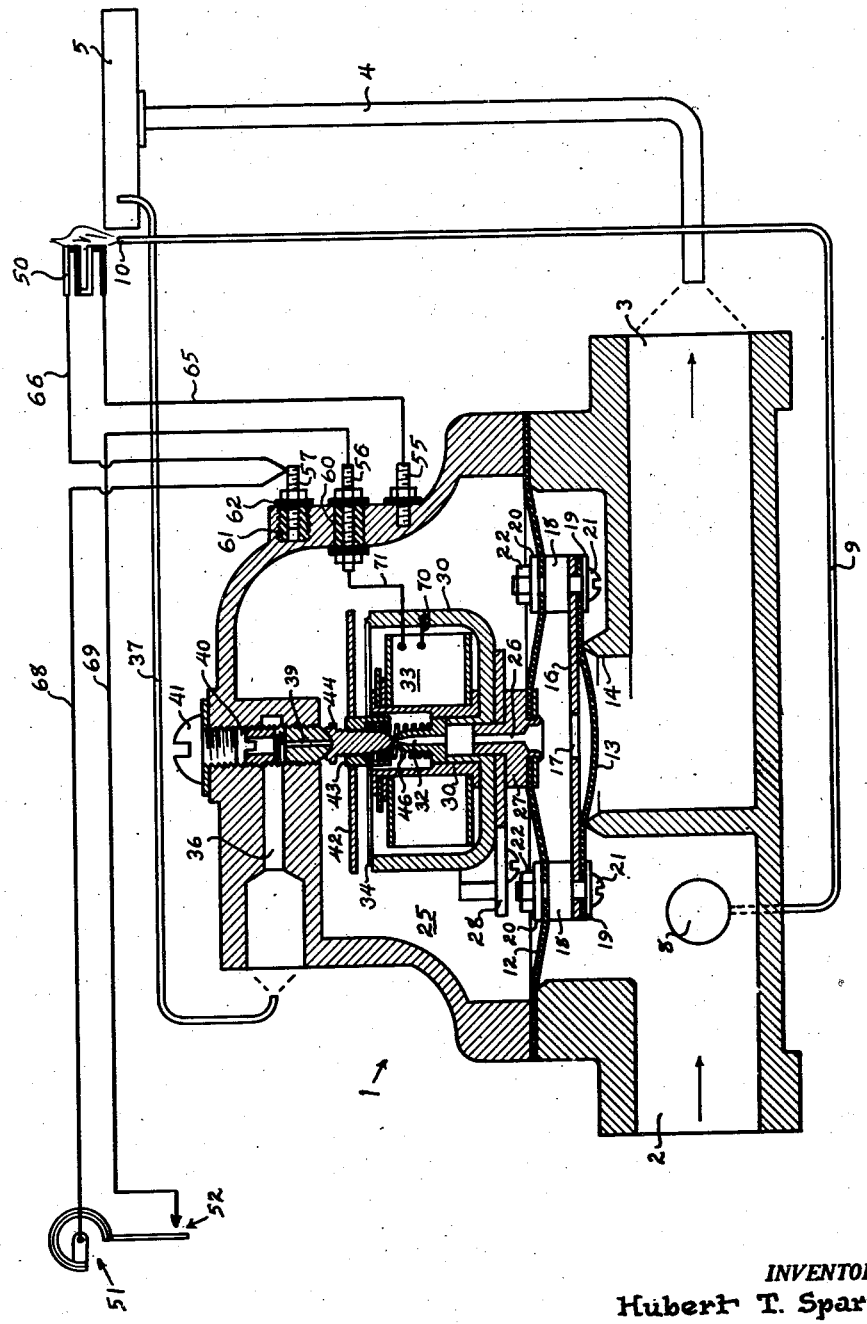
INVENTOR.
Hubert T. Sparrow
BY
George H. Fisher
Attorney Patented Jan. 22, 1946

2,393,427

UNITED STATES PATENT OFFICE 2,393,427

SAFETY VALVE

Hubert T. Sparrow, Minneapolis, Minn., assignor to Minneapolis-Honeywell Regulator Company, Minneapolis, Minn., a corporation of Delaware Application April 3, 1942, Serial No. 437,541

16 Claims. (Cl. 137—139)

This invention relates to a fluid flow control system of the type that is regulated by electromagnetic means operated from a source of relatively low power. More particularly, my invention relates to an improved and novel fluid fuel control valve that is jointly controlled by safety shut-off and condition responsive means. The valve of my invention is operated from a combination thermoelectric source of power and pilot burner device and accordingly is adapted to be both actuated and controlled by a burner heating means. The system may be employed with various types and combinations of burners or heating means. The thermoelectric power generating means is employed to provide sufficient power in a circuit for the actuation of both the valve and additional control means that may be remotely located with respect to the valve and the thermoelectric source of power.

Among the objects of my invention is the provision of a novel diaphragm fuel control valve of a simple construction in which the diaphragm valve is secured to a backing or mounting plate which is supported by the diaphragm motor but spaced therefrom. When the valve is so operated by the diaphragm motor as to closely approach the valve closed position, the valve diaphragm and backing plate are both accelerated to a position in which they are properly aligned and supported upon the valve seat. The acceleration is a result of the fluid acting primarily upon but one side of the valve diaphragm as the diaphragm moves into proximity with the valve seat. The fluid operates through an opening in the backing plate to exert pressure on the inlet side of the valve diaphragm and in conjunction with the decrease in pressure on the valve outlet side of the diaphragm at this time causes the diaphragm to rapidly effect a sealing contact with the valve seat and to properly align the diaphragm backing plate with respect to the valve seat. It is apparent that the initial opening movement of the valve is likewise effected in a rapid and positive manner as the seal is broken and the force of fluid pressure restored to the outlet side of the valve diaphragm is added to the operation of the controlling diaphragm motor.

One object of my invention is the provision of a new and improved diaphragm fluid pressure operated motor of a type that is controlled by an extremely efficient and adjustable electromagnetic device. The diaphragm motor is subjected on one side to fluid admitted to the inlet of the valve. A chamber is located on the other side of the diaphragm and is defined by the diaphragm and the valve casing associated therewith. A fluid inlet line is provided from the inlet side of the valve to the chamber and this line extends through the diaphragm. A fluid outlet or bleed line is also provided for the escape of fluid from the chamber. The electromagnetic device when operated in a first manner prevents the escape of fluid from the chamber bleed line while fluid admitted through the fluid inlet of the chamber establishes a pressure on the diaphragm which is operative, in conjunction with a bias established by the weight of the valve supported by the diaphragm motor, to actuate the valve to a closed position. When actuated in a second manner, the electromagnetic device prevents the admission of fluid to the chamber and at this time the fluid therein escapes through the bleed line to decrease the pressure exerted on the chamber side of the diaphragm whereupon the pressure exerted by the fluid on the valve inlet side of the diaphragm functions to open the valve.

An additional object of my invention is the provision of extremely efficient and adjustable electromagnetic means for regulating the fluid in the chamber that is in part defined by the diaphragm motor. An annular type electromagnet, or solenoid device, having core means which substantially surround the core windings is employed as the electromagnetic actuating means. The fluid inlet line for the chamber extends through the diaphragm motor and along the axis of the electromagnet through a port which is surrounded by the electromagnetic device. The outlet port for the bleed line of the chamber is also located in alignment with the axis of the electromagnet, although the chamber outlet or bleed port is spaced from the electromagnet. The bleed port is adjustably positioned with respect to the electromagnet. An electromagnetic armature is adjustably associated with a valve means which, by operation of the armature, alternately cooperates with the chamber inlet port and the chamber bleed port. The armature is strongly biased to a position in which this valve operating means serves to prevent the escape of fluid from the chamber to the bleed port and this position is adjustable by adjustment of the positioning of the bleed port. With the armature and the valve member in this position, fluid is admitted to the chamber inlet port and a pressure is established upon the diaphragm motor by the fluid admitted to the chamber which serves to close the valve. When the electromagnet is energized the armature and valve means is attracted to a position in which the flow of fluid to the inlet of the chamber is prevented and fluid escapes from the chamber to the bleed port.

The armature is also adjustable with respect to the electromagnet and by reason of the combination of adjustments a desired air gap may be provided between the armature and the electromagnet for both the attracted and the unattracted positions of the armature. The provision of a strong biasing spring and an air gap when the armature is "pulled in" to the attracted position serves to insure the proper "cut out" operation of the armature, without sticking, although the fluid controlled may include gasses that contain very sticky and gum-like deposits.

By adjusting the air gap between the armature and electromagnet, or solenoid device, provision is made for determining the power or voltage which must be supplied to energize the coils sufficiently to attract the armature to the "pulled in" position. The selected position of the armature with respect to the electromagnet when the armature is attracted or "pulled in" operates to determine the power or voltage necessary to retain the armature in the attracted position or the "cut out" point at which the armature will be released. Thus, provision is made for the complete adjustment of the power or voltage operating differential for control of the safety device. It will be noted that a relatively strong biasing spring may be employed and adjustments of the operating differential may be effected over a relatively wide range of power or voltage requirements.

An important object of my invention is the provision of means for effecting the valve regulating adjustments for the assembled valve from the exterior of the valve casing.

A further object of my invention is the provision of a thermoelectric safety valve in which the power requirements for operation of the valve may be adjusted for closing the valve upon extinguishment of the pilot burner although the main burner, or main burners, located in proximity to the thermoelectric unit should continue to operate. The valve of my invention may also be adjusted for operation to a closed position upon the occurrence of a decrease in fuel pressure and a resulting decrease in the heating of the thermoelectric member by the pilot burner. Thus, when the pilot burner operation is so reduced as to be unable to maintain a substantial difference in temperature between the hot and cold junctions of the thermocouple members for operation of the valve in keeping with the operating range for which the electromagnet is adjusted the valve is rapidly operated to the closed position.

A further object of my invention is the provision of novel and improved circuit connector means for connecting the thermocouple or thermopile and the electromagnet of my combination electric generator and safety pilot device to additional circuit controlling means that may be located in a position remote from the thermoelectric and valve members by the addition of three terminal members mounted upon the valve casing. A circuit is completed through two of the terminals between one of a pair of connectors for the thermoelectric device, the windings of the electromagnet and one of the connectors to the remotely located control means and this portion of the circuit may be grounded through the casing. The third valve casing terminal member is insulated with respect to the casing and serves as means for properly securing a second and matched connecting wire of the thermoelectric device with a second connector of the remotely positioned controlling device.

Other objects of my invention will be apparent from a consideration of the accompanying specification, claims and drawing.

In the drawing my invention is shown as relating to a valve for the control of the flow of gas to a burner in a system which is entirely operated from power generated by a thermopile. This thermopile is associated with a pilot burner and in conjunction with the valve functions as a safety cut-off device for controlling the flow of fuel. The thermopile also supplies the electrical energy required for the operation of the system under the control of a thermostat which may be remotely located with respect to both the thermopile and the valve.

As illustrated, the valve generally denoted by the reference character 1 controls the flow of fuel gas from the valve inlet 2 through the valve outlet 3 to a supply line 4 leading to a main burner 5. From the port 8 located on the inlet side of the valve the gas is supplied through a line 9 to a pilot burner 10.

The body portion of the valve is divided into two chambers by a main diaphragm 12. The main diaphragm is actuated in a manner described hereinafter to serve as a motor for operating the diaphragm valve member 13 which as illustrated is in the valve closed position and in contact with a valve seat member 14. The diaphragm valve member 13 is supported upon an annular backing plate member 16 and it will be noted that this backing plate has an opening 17 disposed in the center portion thereof. The diaphragm valve and backing plate are supported by the main diaphragm but spaced therefrom by the annular spacing members 18. For securing the valve diaphragm and backing plate members to the main diaphragm a ring-like member 19 is disposed on the under side of the valve diaphragm and another ring-like member 20 is disposed on the upper side of the main diaphragm. The nut and bolt members 21 and 22, not respectively, serve to maintain the valve and main diaphragm members in their properly assembled relation. With the diaphragm valve in the valve open position, the fluid circulating through the valve operates upon both sides of the diaphragm 13 and maintains the diaphragm in a relatively taut position against the backing plate member 16. When the valve member is positioned closely adjacent to the valve closed position, the pressure is greatly reduced on the valve outlet side of the valve diaphragm with the result that the valve and backing member are moved rapidly to the valve closed position and the valve backing plate 16 is properly aligned and supported upon the valve seating means 14. With the valve in the fully closed position, as illustrated, the pressure on the inlet side of the diaphragm valve serves to separate the valve member 13 from contact with the backing plate and to provide a sealing engagement between the valve seat and the valve diaphragm.

The main diaphragm 12 operates as a fluid pressure motor for controlling the positioning of the valve 13, and this main diaphragm in conjunction with the upper portion of the valve casing defines a chamber 25. A fluid inlet line 26 supplies fluid through the main diaphragm to the chamber 25 and this line is located centrally of a mounting plug 27 which is secured to the main diaphragm. The mounting plug 27 is supported by a bracket member 28 mounted in the casing and within the chamber 25. An annular type electromagnet 30 is likewise supported upon the bracket member 28 and the fluid inlet line for the chamber is disposed centrally or axially of this electromagnet. The fluid inlet port member 32 is likewise disposed centrally of the electromagnet along the axis thereof and is surrounded by the electromagnet.

A fluid outlet or bleed line 36 is provided for the escape of fluid from the chamber 25, and the fluid permitted to escape is supplied through the line 37 for disposal at a position adjacent the burner members. Threadedly mounted for adjustment within the valve casing and for cooperation with the bleed line is an outlet bleed port member 39 which is threaded well within the opening 40 in the casing. The bleed port member 39 has a screw-like head having a kerf or a hex passage formed therein for cooperation with a key member to provide for the adjustable movement of the threaded port member 39 in the passage 40 which is in alignment with an extension of the axis of the annular electromagnet. It is readily apparent that the position of the bleed port member may be readily adjusted by operation of a screw driver or key member and also that the bleed port member may be removed from the casing, if desired, for the purpose of adjusting an armature operated valve member 44.

A screw member 41 is adapted to be threaded into the exterior portion of the opening 40 in the valve casing and serves as a plug member for protecting the bleed port member 39 in a selected position of adjustment. The bleed port 39 has an opening centrally thereof which leads to a kerf or an opening therein for cooperation with the bleed line 36 for all operating positions of adjustment of this member.

The armature 42 of the electromagnet is mounted upon a biasing spring guide cup 43 and this guide cup is threadedly mounted upon a valve member 44 along which it is selectively positioned. The valve member 44 is positioned by the armature to alternately cooperate with the chamber inlet port 32 and the chamber bleed port 39. A relatively strong biasing spring 46 is provided for maintaining the armature and the valve member in a position preventing the flow of fluid through the bleed port when the electromagnet is deenergized. This biasing spring 46 is mounted within the center portion of the electromagnet and extends axially thereof in a position having one end surrounding the chamber inlet port and the other end supported in the spring guide cup 43.

With the electromagnet deenergized and the biased armature maintaining the valve 44 in a position preventing the escape of gas from the bleed port the chamber 25 is rapidly supplied with gas admitted through the inlet port 32 to increase the pressure exerted upon the upper portion of the diaphragm 12. At this time the fluid pressure diaphragm motor 12, biased by the weight of the valve members supported therefrom, moves the diaphragm valve 13 to the closed position.

When the electromagnet is energized the armature is pulled in to its attracted position where the valve member 44 then prevents the flow of fuel through inlet port 32 to the chamber 25 and at this time the fluid rapidly escapes through the bleed port to the bleed line 36. With the escape of fluid from the chamber 25 the pressure exerted upon the upper portion of the diaphragm motor 12 is rapidly decreased and the valve inlet fluid pressure acting on the lower side of the diaphragm operates the diaphragm motor for moving the valve to a valve open position.

It will be noted that the electromagnet is of a most efficient type in which the windings 33 are substantially surrounded by the core members 30. The annular core member 30 is designed with a slight annular rim-like raised portion 34 which serves to efficiently direct the magnetic flux with respect to the armature while at the same time reducing the possible area of contact of the core and armature members.

The thermoelectric source of power for operation of my valve and system and consisting of a thermocouple or thermopile 50 is schematically illustrated in conjunction with the pilot burner 10. The thermoelectric generator and pilot burner unit is preferably of the type illustrated in my application Serial No. 340,745 filed June 14, 1940, now Patent No. 2,311,785, dated Feb. 23, 1943. The thermoelectric source of power and pilot burner unit for operation of a valve and thermostat in accordance with my invention may be employed with various types of burners or heating means and the preferred combination thermopile and burner unit is mounted within the heater chambers, although also adapted for use with open type burners.

The thermoelectric member 50 is directly connected to the electromagnetic valve member which is adjusted for operation as a fuel safety shut-off device to prevent operation of the burner when the pilot flame is either extinguished or functions improperly. Thus, the valve may be adjusted to function as a safety shut-off device upon the occurrence of a drop in fuel pressure with a corresponding decrease in the pilot flame and an attendant failure to maintain a selected or required differential in temperature of the hot and cold junctions of the thermoelectric device.

In my system as illustrated the thermoelectric power supply member 50 is connected to a remotely positioned thermostat 51 which operates a switch 52 for controlling the energization of the electromagnet for operation of the valve. In this fuel control system an external source of power and a separate safety shut-off device are not required since the thermoelectric generator functions both for the supply of the power required to operate the valve under the control of the thermostat and as a safety device for the rapid shut-off of the valve in response to improper operation of the pilot burner.

The circuit for the valve, the thermostat and the thermoelectric member includes the use of three terminal binding post members 55, 56 and 57 which are mounted on the valve casing. The terminal 55 is grounded to the casing for use in accordance with my preferred control circuit which is described below. The terminal 56 is insulated from the casing by a bushing member 60 and extends entirely through the casing. The terminal 57 is insulated with respect to the casing by an insulating plug 61 and an insulating washer member 62.

In my preferred circuit two connecting wires 65 and 66 which are matched with respect to both length and resistance are employed in connection with the terminals of the thermoelectric device. One of these wires 65 is connected to the grounded terminal member 55 while the other wire 66 is secured to the terminal member 57. A wire 68 also secured to the terminal member 57 is connected to the thermostat 51 which is located remote from the valve and burners and a wire 69 substantially of the same length as wire 68 is secured at one end to the terminal member 56 and at the other end to the thermostatically controlled switching means 52. One connection of the coil windings of the electromagnet is grounded to the core member 30 through a lead wire 70. A second terminal of the electromagnet windings is connected to the casing terminal member 56 by a lead wire 71.

The operation of the circuit is as follows: upon a call for heat the thermostat 51 operates to close the switching means 52 and power is supplied from the thermoelectric device to wire 66, terminal 57, wire 68, thermostat 51, switch 52, wire 69, terminal 56 and wire 71 to a terminal of the windings of the electromagnet, the second terminal of the windings is connected by the wire 70 to the grounded core of the relay member 30. The second terminal of the thermoelectric device is connected by wire 65 to the grounded terminal member 55 to complete the circuit. The electromagnet is thus energized and the armature attracted to the pulled in position in which the valve 13 is actuated to the open position in the manner described above. When the thermostat operates to open the switch 52 or upon improper operation of the pilot burner flame, the electromagnet is rapidly deenergized and the flow control valve 13 moved to the closed position.

In the control of a gas or of a fluid containing sticky or gum-like substances proper operation of the valve and the elimination of sticking between the core and armature is accomplished by adjusting the armature 42 on the valve member 44 to provide an air gap between the core and armature when the armature is pulled in to the attracted position. Also, as referred to above, the rim 34 of the core 30 serves to reduce to a minimum the area of possible contact between the core and armature to further insure against any possibility of the armature and core sticking to maintain the control valve in the open and unsafe position. The symmetrical arrangement of the cooperating and adjustable chamber inlet and bleed port members with the highly efficient electromagnet and the arrangement of the port controlling valve member that is adjustable with respect to the armature provides for the use of a relatively very strong biasing spring 46 to further insure against sticking of the armature and core.

The provision of a wide range of adjustment of the armature with respect to the core and the accompanying air gap which may be maintained between the members in both the attracted and unattracted positions also provides for the control of the electromagnet over a predetermined operating range of the power, or of the current and voltage, required for both initially attracting the armature and for maintaining it in the attracted position. The valve may accordingly be adjusted for operation within a predetermined variation in the temperature differential maintained by the pilot flame between the hot and cold junctions of the thermoelectric device 50. The adjustments accordingly provide for determining the time required for the shut-down of the valve in the performance of a safety function upon improper operation of the pilot burner as a result of the selection of the temperature differential which must be maintained between the junctions of the thermocouple members for the continued operation of the valve in the open position. It is also apparent that the adjustment of the air gap between the core and armature when the electromagnet is deenergized provides for the selection of the temperature differential which must be established between the junctions of the thermocouple members to provide sufficient power for the electromagnet to initially pull in or attract the armature and to thus provide for the operation of the diaphragm motor for opening the valve.

In the new and improved system of my invention it will be noted that I provide an electromagnetic device that may be adjusted for operation with any given thermoelectric device, or other relatively low source of power, in a manner that may be controlled by switching and condition responsive means that may be removed a maximum distance from the electromagnetic and thermoelectric devices. Also in accordance with my invention the devices of the system may be removed for operation at a maximum distance from each other.

It will be apparent that the novel and improved system of my invention employing a combination control member, electromagnetically actuated device and a thermoelectric or relatively low source of power may readily be adapted to a variety of modifications and uses. The scope of the invention is accordingly defined by the claims.

I claim as my invention:

1. The combination comprising, a valve casing, a main diaphragm dividing the said casing into a first chamber and a second chamber, a valve seat in the first chamber, a valve comprising a supporting plate having a central opening therein and a valve diaphragm secured thereto, spacing means supporting the valve from the said main diaphragm, the said valve serving to bias the main diaphragm spaced therefrom to a position for closing the valve and in which closed position the fluid acts upon the valve diaphragm to maintain a seal between the valve diaphragm and valve seat, fluid inlet means for the supply of fluid to the second chamber, an annular electromagnet in said second chamber and having the inlet means extending axially therein, a bleed line from the second chamber having a port thereof aligned axially of the said electromagnet, an armature, means actuated by the armature for preventing the flow of fluid through the inlet when the armature is attracted by the electromagnet and for preventing the flow of fluid through the bleed port upon deenergization of the electromagnet, relatively strong biasing means for positive operation of the armature from the attracted position and for maintaining the armature in the position preventing flow of fluid through the bleed port upon deenergization of the electromagnet, means for adjusting the relative positioning of the armature actuated means, the inlet and the bleed line with respect to the armature and of the armature with respect to the electromagnet, for adjusting the energization requirements of the electromagnet in the operation of the armature and also the positioning of the armature with respect to the electromagnet, and casing means for cooperation with the said relative adjustment means in order that adjustments may be made through the casing of the assembled valve device.

2. A fluid flow control device in combination comprising, diaphragm valve means having the diaphragm divide a flow control device into a first chamber and a second chamber, a valve seat in the first chamber, an annular type electromagnet in which the core means substantially surrounds the coil means, fluid inlet means disposed centrally of the said annular electromagnet and extending through the said diaphragm means for admitting fluid to the said second chamber, fluid outlet means for the bleeding of fluid from the said second chamber, movable means including an armature for said electromagnet, said movable means being adjustable with respect to the electromagnet for operation between two selected positions in one of which the flow of fluid through the said second chamber fluid inlet means is prevented and in the other of which the bleeding of fluid from the said second chamber outlet means is prevented, and relatively strong biasing means for maintaining the armature in the selected position for preventing the bleeding of fluid from the second chamber and admitting fluid thereto when the electromagnet is deenergized for closing the valve by operation of the pressure exerted by the fluid in the second chamber.

3. The combination comprising, a diaphragm valve operating means dividing a flow control device into a first chamber and a second chamber, a valve seat in the first chamber, a solenoid in the second chamber, fluid inlet means including an inlet port located in the interior of the solenoid and said fluid inlet means extending through the said diaphragm means for admitting fluid from the first chamber to the second chamber, fluid outlet means for the bleeding of fluid from the said second chamber including an outlet port in alignment with the axis of the solenoid, and movable means including the solenoid armature adjustably mounted for varying the position of the armature with respect to the solenoid when the solenoid is both energized and deenergized with respect to the said inlet and outlet ports, said movable means being operable when the solenoid is energized to prevent the flow of fluid through the said second chamber fluid inlet means and when deenergized to prevent the bleeding of fluid from the said second chamber outlet means, the adjustable movable means also serving to vary the energization requirements of the solenoid in attracting and releasing the armature.

4. A fluid flow control system in combination comprising, diaphragm actuated valve means including a diaphragm dividing a flow control device into a first chamber and a second chamber, a valve seat in the first chamber, fluid inlet means extending through the said diaphragm means for admitting fluid to the said second chamber, fluid outlet means for the bleeding of fluid from the said second chamber, electromagnetic means, movable means actuated by an armature positioned by the electromagnetic means for operation between two selected positions in the first of which the flow of fluid through the said second chamber fluid inlet means is prevented and in the second of which the bleeding of fluid from the said second chamber is prevented, means for adjusting the said two positions and for adjusting the positioning of the armature by the said electromagnetic means, and means for regulating the said adjustment means from the exterior of the flow control device.

5. A combination comprising, a diaphragm actuated valve means dividing a flow control device into a first chamber and a second chamber, a valve seat in the first chamber, an electromagnet in the second chamber, fluid inlet means for admitting fluid to the said second chamber, fluid outlet means for the bleeding of fluid from the said second chamber including an outlet port, movable means including an armature of the electromagnet, said movable means being operable in conjunction with the said fluid inlet and outlet ports to regulate the fluid in the said second chamber, means for adjusting the armature with respect to the electromagnet to vary the energization requirements of the electromagnet for operation of the said movable means, and means extending through the casing of the flow control device for operating the adjustment means from the exterior thereof.

6. A fluid control device in combination comprising, a body member, a diaphragm flow control member, a rigid backing plate to which the diaphragm is secured adjacent its periphery, said backing plate supporting the said diaphragm and having an opening therein, seating means for supporting the said diaphragm flow control member and backing plate in a position for preventing the flow of fluid through the said body member, said opening in said backing plate being on the inlet side of said seating means, motor means for regulating the positioning of the said diaphragm and backing plate for controlling the flow of fluid through said body member, and the said diaphragm and backing plate when positioned adjacent the seating means providing for the admission of fluid through the opening in said backing plate to but one side of the diaphragm flow control member in a manner to align the backing plate in a position fully supported by the said seating means and in which the diaphragm serves as sealing means for preventing the flow of fluid.

7. A fluid flow device in combination comprising, a valve body, a diaphragm dividing the said body into two compartments, a main valve spaced from and supported by said diaphragm for cooperation with a valve seat in one of said compartments, the space between said main valve and said diaphragm providing a fluid passageway, an electromagnetic armature actuating device in the other of said compartments, an inlet for admitting fluid to the first mentioned compartment, passage means for supplying fluid through said diaphragm to the other of said compartments, outlet means from said other compartment for permitting the escape of fluid therefrom, regulating means including the armature of the electromagnetic device for controlling the fluid in the said other compartment, the armature when actuated in a first manner operating to open said passage means through said diaphragm and close said outlet means to increase the fluid supply to the said other compartment for creating a pressure on the diaphragm serving to close the said valve and the said armature when actuated in a second manner operating to close said passage means through said diaphragm and open said outlet means to reduce the fluid pressure in the said other compartment and upon that side of the diaphragm thereof for opening the said valve, and means during closing operation for directing fluid pressure against the central portion of said valve to cause a snap action closing of said valve from a position closely adjacent its seat independently of movement of said diaphragm.

8. A fluid flow control device comprising in combination a valve housing having an inlet chamber and an outlet chamber, an annular valve seat disposed between said chambers, a diaphragm valve disc in said inlet chamber adapted to seat on said valve seat, a rigid backing plate having an opening centrally thereof, said diaphragm being secured adjacent its periphery to said backing plate, and motor means for moving said backing plate between positions in which said diaphragm valve disc engages and is out of engagement with said valve seat, said diaphragm valve disc being urged into seating engagement with said valve seat by reason of the pressure exerted between said backing plate and said disc by the inlet pressure entering through said opening.

9. In a diaphragm valve assembly, a housing, a diaphragm dividing said housing into two chambers, valve means carried by said diaphragm and disposed in one chamber to control the flow of fuel therethrough, a fixed support in the other chamber to which the central portion of said diaphragm is secured, said central portion of said diaphragm and said support having a passage extending therethrough and terminating in a pilot valve seat member, a pilot valve element movable into and out of engagement with said valve seat member, and actuating means in said last named chamber for actuating said pilot valve element.

10. In a diaphragm valve assembly, a housing, a diaphragm dividing said housing into two chambers, valve means carried by said diaphragm and disposed in one chamber to control the flow of fuel therethrough, a fixed support in the other chamber to which the central portion of said diaphragm is secured, said central portion of said diaphragm and said support having a passage extending therethrough and terminating in a pilot valve seat member, a second pilot valve seat member axially aligned with and facing said first named pilot valve seat member, a pilot valve element movable between said two valve seat members, and actuating means in said last named chamber for moving said pilot valve element between said valve seat members.

11. In a diaphragm valve assembly, a housing, a diaphragm dividing said housing into two chambers, one of said chambers having a valve seat dividing said chamber into inlet and outlet portions, a valve backing disc carried by said diaphragm in the inlet portion of said first chamber in spaced relation to said diaphragm, a diaphragm valve disc secured adjacent its periphery to said backing plate and adapted to seat on said valve seat, said plate having an opening therethrough for supplying inlet pressure to the chamber between said valve disc and backing plate, a fixed support in the other chamber to which the central portion of said diaphragm is secured, said central portion of said diaphragm and said support having a passage extending therethrough and terminating in a pilot valve seat member, a pilot valve element movable into and out of engagement with said pilot valve seat member, and actuating means for actuating said pilot valve element to vary the pressure above said diaphragm and thereby vary its position.

12. In a diaphragm valve assembly, a housing, a diaphragm dividing said housing into two chambers, valve means carried by said diaphragm and disposed in one chamber to control the flow of fuel therethrough, a fixed support in the other chamber to which the central portion of said diaphragm is secured, an electromagnet secured to said support, said central portion of said diaphragm and said magnet having a passage extending therethrough and terminating in a pilot valve seat member, a second pilot valve seat member axially aligned with and facing said first named valve seat member, a pilot valve element movable between said two valve seat members, and an armature secured to and surrounding said pilot valve element for actuating the same.

13. In combination, an electromagnet having a central core with an opening extending axially therethrough and terminating in a valve seat member, apertured diaphragm securing means fixed in the opening of said core, a valve element movable into and out of engagement with said valve seat member, and an armature secured to and surrounding said valve element for actuating the same, said valve element being adjustable in respect to said valve seat and the armature of said electromagnet, and a second valve seat member positioned in operable association with said valve element.

14. In combination, an electromagnet having a core provided with an opening extending axially therethrough and terminating in a valve seat member, means for securing a diaphragm to said core, a second valve seat member axially aligned with and facing said first named valve seat member, a valve element movable between said two valve seat members, and an armature secured to and surrounding said valve element for actuating the same.

15. In combination, an electromagnet, an opening extending axially therethrough and terminating in a valve seat member, diaphragm securing means associated with said electromagnet, a second valve seat member axially aligned with and facing said first named valve seat member, a valve element movable between said two valve seat members, and an armature adjustably secured to and surrounding said valve element for actuating the same, said armature being adjustable longitudinally of said valve element.

16. In combination, an electromagnet having a recess and an opening extending axially therethrough and terminating in a fixed valve seat member within said recess, the other end of said opening providing means for attaching a diaphragm thereto, a second valve seat member axially aligned with and facing said first named valve seat member, said second valve seat member being adjustable longitudinally of its axis, a valve element movable between said two valve seat members, an armature secured to and surrounding said valve element for actuating the same, and a spring disposed in said recess and biasing said armature to a position in which said valve element is in engagement with said second valve seat member.

HUBERT T. SPARROW.